US010493687B2

(12) United States Patent
Jeon et al.

(10) Patent No.: US 10,493,687 B2
(45) Date of Patent: Dec. 3, 2019

(54) APPARATUS AND METHOD FOR MANUFACTURING DISPLAY APPARATUS

(71) Applicant: SAMSUNG DISPLAY CO., LTD., Yongin-si, Gyeonggi-do (KR)

(72) Inventors: Jaeseung Jeon, Yongin-si (KR); Kyunghwan Jung, Yongin-si (KR); Jongkap Jo, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 356 days.

(21) Appl. No.: 15/172,725

(22) Filed: Jun. 3, 2016

(65) Prior Publication Data
US 2017/0120501 A1    May 4, 2017

(30) Foreign Application Priority Data
Oct. 29, 2015    (KR) .......................... 10-2015-0151094

(51) Int. Cl.
*B29C 51/08*    (2006.01)
*B29C 51/20*    (2006.01)
(Continued)

(52) U.S. Cl.
CPC ............ *B29C 51/082* (2013.01); *B29C 51/20* (2013.01); *B29C 51/42* (2013.01); *B29C 51/421* (2013.01); *B29L 2031/3475* (2013.01)

(58) Field of Classification Search
CPC ..... B29C 51/082; B29C 51/421; B29C 51/42; B29C 51/20; B29C 51/002; B29C 51/18; B29C 51/30; B29C 51/24; B29C 33/305; B29C 33/307; B29C 45/64; B29C 33/202; B29C 45/66; B29C 45/67; B29C 45/6721; B29C 53/04; B29C 53/06; B29C 2791/001; B29L 2031/3475; B29B 13/023;
(Continued)

(56) References Cited

U.S. PATENT DOCUMENTS 4,891,055 A * 1/1990 Shibaoka ............ C03B 23/0258
                                                        65/104
5,938,810 A * 8/1999 De Vries, Jr. ....... C03B 23/0352
                                                        65/103
(Continued)

FOREIGN PATENT DOCUMENTS

KR    1020110096455 A    8/2011
KR    1020130094570 A    8/2013
(Continued)

OTHER PUBLICATIONS

Translation of KR-101537811-B1 (Year: 2015).*
Translation of WO-2015064978-A1 (Year: 2015).*

*Primary Examiner* — Leith S Shafi
(74) *Attorney, Agent, or Firm* — Cantor Colburn LLP (57) ABSTRACT

An apparatus for manufacturing a display apparatus includes a deforming unit which deforms a shape of a cover window by pressing the cover window, where the deforming unit includes a first mold, on which the cover window is accommodated; a sleeve, which is spaced apart from the first mold and moves linearly to the first mold; a second mold, which is inserted into the sleeve to move linearly to the first mold to deform a portion of the cover window; and a pressing plate, which presses the sleeve and the second mold to the first mold.

9 Claims, 7 Drawing Sheets

(51) Int. Cl.
*B29C 51/42* (2006.01)
*B29L 31/34* (2006.01)

(58) Field of Classification Search
CPC ......... B21D 22/06; C03B 11/00; C03B 11/04;
C03B 11/082; C03B 11/06; C03B
23/0013; C03B 23/002; C03B 23/02;
C03B 23/023; C03B 23/0256; C03B
23/03; C03B 23/0305
USPC ............. 65/106–107; 425/193, 450.1–451.7,
425/451.9
See application file for complete search history.

(56) References Cited

U.S. PATENT DOCUMENTS

| | | | | |
|---|---|---|---|---|
| 7,037,458 | B2* | 5/2006 | Ford | B29C 59/02 |
| | | | | 264/293 |
| 2011/0019286 | A1* | 1/2011 | Nanba | C03C 3/068 |
| | | | | 359/642 |
| 2013/0337224 | A1* | 12/2013 | Odani | G06F 1/1626 |
| | | | | 428/130 |
| 2015/0000339 | A1 | 1/2015 | Jang et al. | |
| 2015/0000340 | A1 | 1/2015 | Jang et al. | |

FOREIGN PATENT DOCUMENTS

| | | | | |
|---|---|---|---|---|
| KR | 1020150001955 A | 1/2015 | | |
| KR | 1020150001964 A | 1/2015 | | |
| KR | 1020150048450 A | 5/2015 | | |
| KR | 101537811 B1 * | 7/2015 | ............. | B29C 37/00 |
| WO | WO-2015064978 A1 * | 5/2015 | ......... | C03B 23/0302 |

* cited by examiner

APPARATUS AND METHOD FOR MANUFACTURING DISPLAY APPARATUS

This application claims priority to Korean Patent Application No. 10-2015-0151094, filed on Oct. 29, 2015, and all the benefits accruing therefrom under 35 U.S.C. § 119, the content of which in its entirety is herein incorporated by reference.

BACKGROUND

1. Field

One or more embodiments relate to an apparatus for manufacturing a display apparatus and a method using the apparatus, and more particularly, to a display apparatus manufacturing apparatus and a method for manufacturing a display apparatus using the display apparatus manufacturing apparatus.

2. Description of the Related Art

In recent, mobile electronic devices are being widely used. Such mobile electronic devices typically include, not only small electronic devices, such as mobile phones, but also tablet personal computers ("PC"s), which are widely used.

A mobile electronic device typically includes a display device for providing visual information, such as images or videos, for supporting various functions. Recently, as parts for driving a display device are being miniaturized, display devices have become increasingly important in mobile electronic devices, and display devices that may be bent by a certain angle, curved or foldable, are also being developed.

SUMMARY

One or more embodiments include a display apparatus manufacturing apparatus and a method of manufacturing a display apparatus with reduced defects of a cover window that may occur due to irregular pressure applied to the cover window during a conventional manufacturing method of the cover window.

According to one or more embodiments, a display apparatus manufacturing apparatus includes a deforming unit which deforms a shape of a cover window by pressing the cover window. In such an embodiment, the deforming unit includes a first mold, on which the cover window is accommodated; a sleeve, which is disposed to be spaced apart from the first mold and moves linearly to the first mold; second mold, which is inserted to the sleeve to move linearly to the first mold to deform a portion of the cover window; and a pressing plate, which presses the sleeve and the second mold to the first mold.

According to the embodiment, insertion holes, in which the second mold is inserted and moves linearly, may be defined in the sleeve.

According to an embodiment, the pressing plate may include a heater which heats the cover window.

According to an embodiment, the pressing plate may sequentially contact the second mold and the sleeve when the pressing plate presses the sleeve and the second mold.

According to an embodiment, widths of the second mold in the lengthwise direction of the sleeve may be inconstant.

According to an embodiment, the width of a portion of the second mold close to the sleeve may be greater than the width of a portion of the second mold close to the first mold.

According to an embodiment, the second mold may include a plurality of sub-molds, and the plurality of sub-molds may be disposed to move linearly to contact portions of the cover window to be deformed.

According to an embodiment, a step may be formed between a portion of the pressing plate contacting the second mold and a portion of the pressing plate contacting the sleeve.

According to an embodiment, the display apparatus manufacturing apparatus may further include a cooler which cools the cover window transferred from the deforming unit.

According to one or more embodiments, a method of manufacturing a display apparatus includes: accommodating a cover window on a first mold; pre-heating the cover window on the first mold; arranging a sleeve and a second mold on the cover window; and molding the cover window by pressing the sleeve and the second mold to the first mold.

According to an embodiment, the molding the cover window by pressing the sleeve and the second mold may include moving a pressing plate to contact the second mold and the sleeve, where the second mold and the sleeve may be disposed in a way such that the pressing plate sequentially contact the second mold and the sleeve when the pressing plate moves to the second mold and the sleeve.

According to an embodiment, the method may further include transferring the first mold on which the cover window is accommodated.

According to an embodiment, the molding the cover window by pressing the sleeve and the second mold may include heating the cover window.

According to an embodiment, the method may further include cooling the cover window.

According to an embodiment, the cooling the cover window may include arranging a pressing plate including a cooler on the sleeve and the second mold.

According to an embodiment, the second mold may be inserted to the sleeve and moves linearly.

According to an embodiment, the sleeve may contact a flat portion of the cover window and supports the cover window, and the second mold may contact a portion of the cover window to be deformed.

According to an embodiment, the second mold may include a plurality of sub-molds, and the plurality of sub-molds may be disposed to move linearly to the portion of the cover window to be deformed.

According to an embodiment, the widths of the second mold in the lengthwise direction of the sleeve may be inconstant.

BRIEF DESCRIPTION OF THE DRAWINGS

These and/or other features of embodiments of the invention will become apparent and more readily appreciated from the following description of the embodiments, taken in conjunction with the accompanying drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that although the terms "first", "second", etc. may be used herein to describe various components, these components should not be limited by these terms. These components are only used to distinguish one component from another.

As used herein, the singular forms "a," "an" and "the" are intended to include the plural forms as well, unless the context clearly indicates otherwise. "Or" means "and/or." As used herein, the term "and/or" includes any and all combinations of one or more of the associated listed items.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when a layer, region, or component is referred to as being "on" another layer, region, or component, it can be directly or indirectly formed on the other layer, region, or component. That is, for example, intervening layers, regions, or components may be present.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Sizes of elements in the drawings may be exaggerated for convenience of description. In other words, since sizes and thicknesses of components in the drawings are arbitrarily illustrated for convenience of description, the following embodiments are not limited thereto.

Herein, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Herein, a specific process order may be performed differently from the described order. For example, two consecutively described processes may be performed substantially at the same time or performed in an order opposite to the described order.

Figure 1:
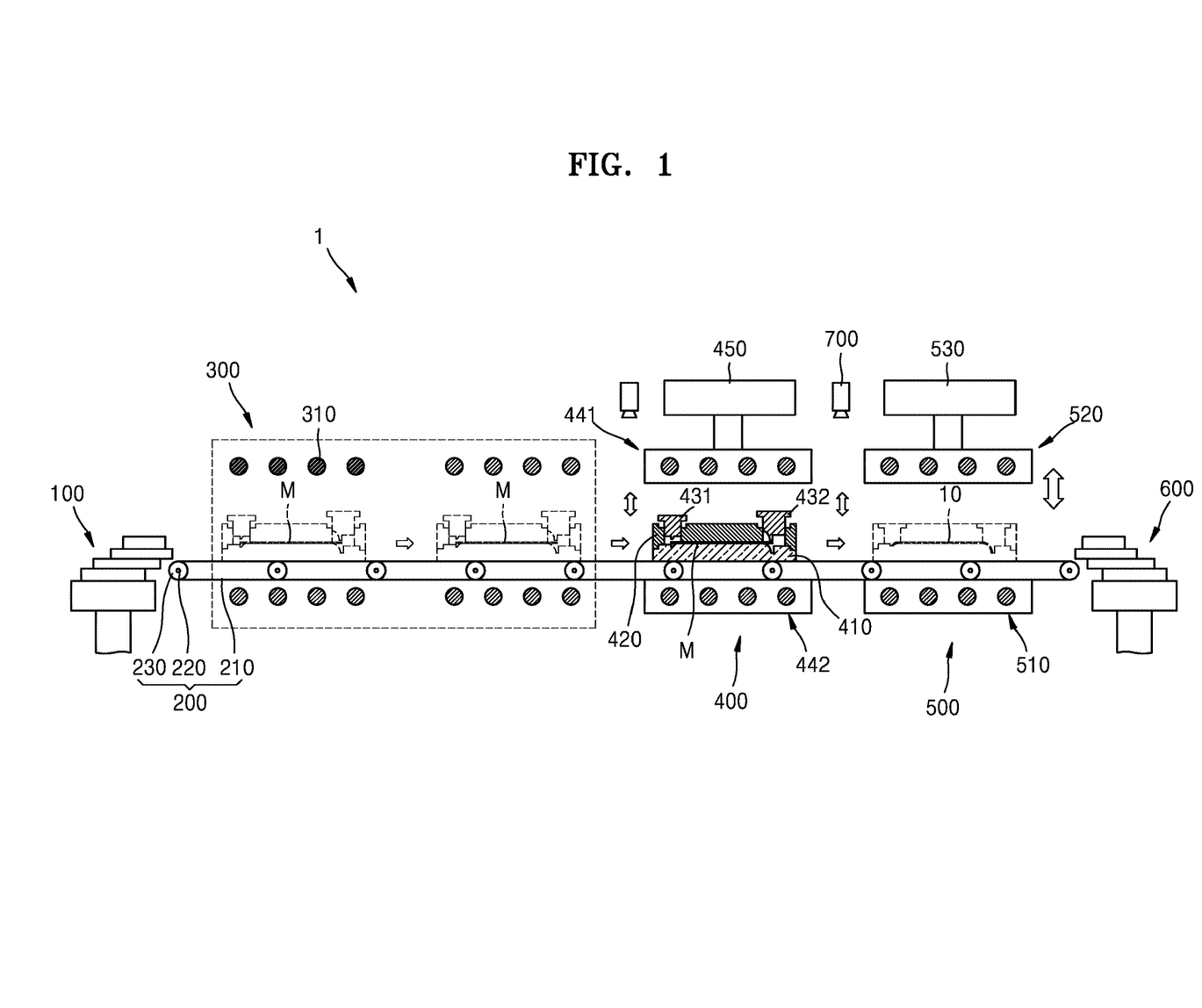
FIG. 1 is a diagram showing an apparatus for manufacturing a display apparatus, according to an embodiment.
Figure 2:
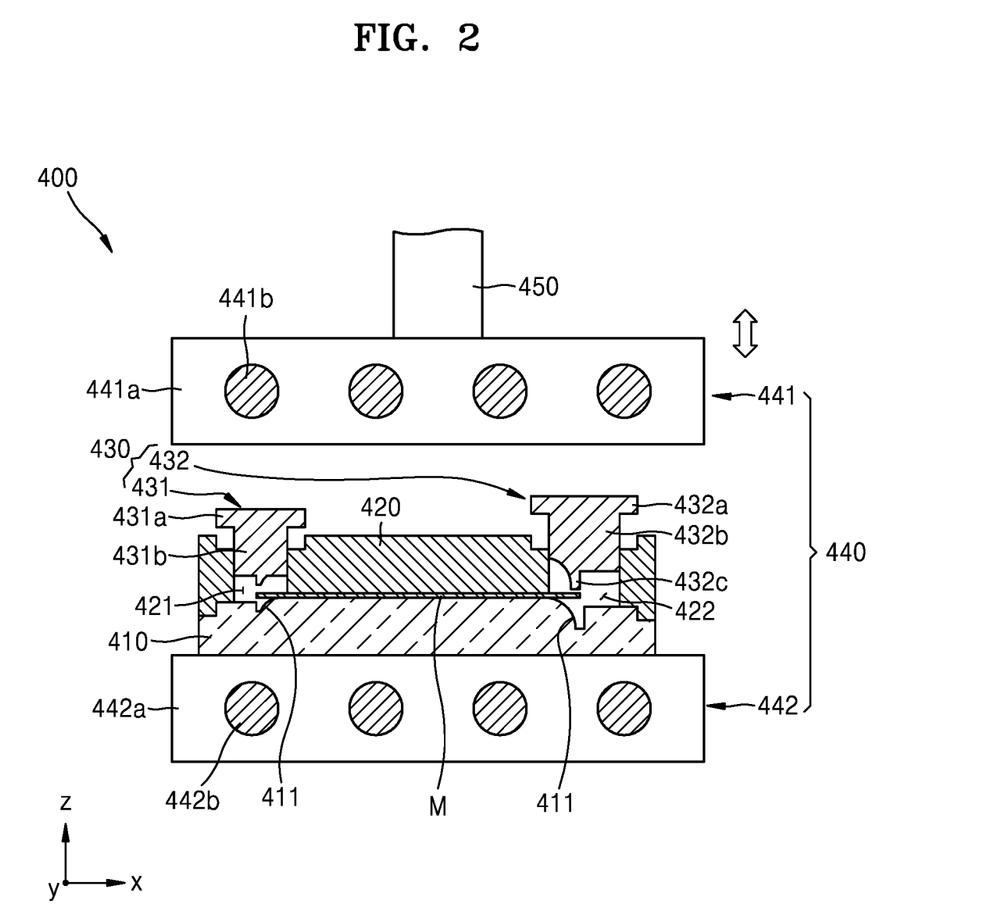
FIG. 2 is a cross-sectional diagram showing a portion of a deforming unit of the apparatus for manufacturing a display apparatus shown in FIG. 1.
Figure 3:
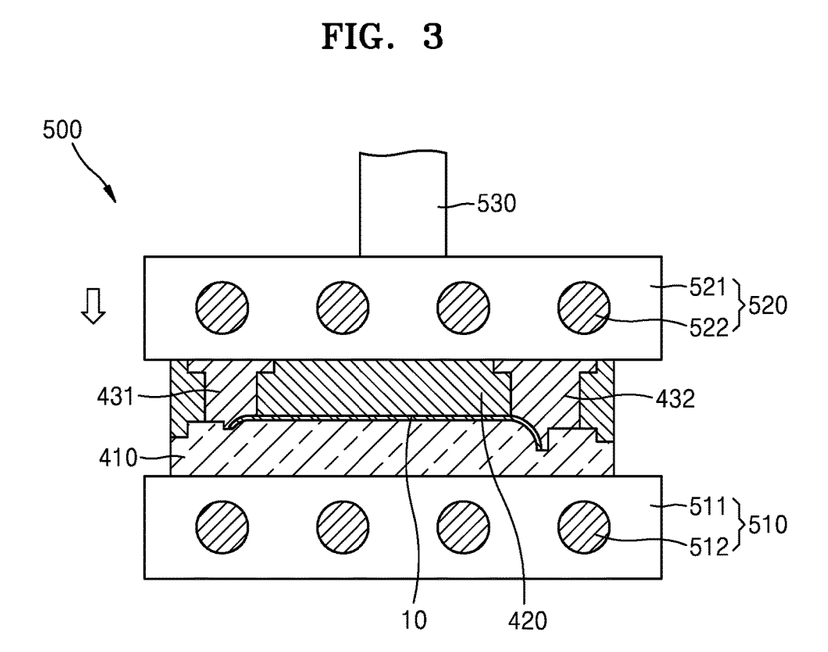
FIG. 3 is a cross-sectional diagram showing a portion of a cooling unit of the apparatus for manufacturing a display apparatus shown in FIG. 1.

FIG. 1 is a diagram showing a display apparatus manufacturing apparatus 1 for manufacturing a display apparatus, according to an embodiment. FIG. 2 is a sectional diagram showing a portion of a deforming unit of the display apparatus manufacturing apparatus shown in FIG. 1. FIG. 3 is a sectional diagram showing a portion of a cooling unit of the display apparatus manufacturing apparatus 1 shown in FIG. 1.

Referring to FIGS. 1 through 3, an embodiment of a display apparatus manufacturing apparatus 1 may include a loading unit 100, a transferring unit 200, a pre-heating unit 300, a deforming unit 400, a cooling unit 500, and an unloading unit 600.

A cover window 10 transferred from outside may be supplied to the loading unit 100, and the transferring unit 200 may be installed at the loading unit 100. In such an embodiment, the loading unit 100 may control or adjust an outside pressure and an inside pressure, and the cover window 10 may be transferred to the transferring unit 200 via a robot arm (not shown) of the loading unit 100, for example.

The transferring unit 200 may be installed to penetrate through the loading unit 100, the pre-heating unit 300, the deforming unit 400, the cooling unit 500 and the unloading unit 600. In such an embodiment, the transferring unit 200 may have one of various structures. In one embodiment, for example, the transferring unit 200 may include a conveyer belt 210, a plurality of rollers 220, and a roller driver 230. The conveyer belt 210 may contact the plurality of rollers 220 and constitute a closed-loop, and the roller driver 230 may revolve at least one of the plurality of rollers 220. According to an alternative embodiment, the transferring unit 200 may have an air-bearing structure. According to another alternative embodiment, the transferring unit 200 may include the plurality of rollers and the roller driver. According to another alternative embodiment, the transferring unit 200 may include a linear motion guide and a linear driver. In such an embodiment, the linear driver may include a linear motor. According to another alternative embodiment, the transferring unit 200 may include a ball screw and a motor for rotating a screw of the ball screw. However, structures of the transferring unit 200 are not limited to the above-stated structures, and the transferring unit 200 may include any device or structure for accommodating and transferring a first mold 410 described below.

The pre-heating unit 300 may include a pre-heater 310 disposed to be spaced apart from the transferring unit 200. The pre-heater 310 may have one of various structures. In one embodiment, for example, the pre-heater 310 may include a laser beam irradiating unit that irradiates a laser beam. According to an alternative embodiment, the pre-heater 310 may be arranged as a coil for providing radiant heat and convection heat. According to another alternative embodiment, the pre-heater 310 may have a bar-like shape or a plate-like shape, such as a ceramic heater. However, for convenience of description, an embodiment where the pre-heater 310 has a bar-like shape like a ceramic heater will hereinafter be described in detail.

In such an embodiment, as shown in FIG. 2, the deforming unit 400 may include a first mold 410, a sleeve 420, second molds 430, a pressing plate 440 and a driver 450.

The cover window 10 or a material thereof M may be accommodated on the first mold 410. In an embodiment, a groove 411 having a shape corresponding to the shape of the cover window 10 after the cover window 10 is completely molded may be defined on a surface of the first mold 410. Herein, the groove 411 means a concavo-convex portion of the first mold 410 defined based on a groove formed on a surface thereof. In such an embodiment, a portion of the groove 411 of the first mold 410 may have a certain curvature, and another portion of the groove 411 may be flat. In such an embodiment, the shape of the groove 411 of the first mold 410 is not limited thereto and may vary according to shapes of the cover window 10.

The cover widow 10 may have various shapes. In one embodiment, for example, two opposite end portions of the cover window 10 may be curved, and the center portion of the cover window 10 may be flat. In such an embodiment, the two opposite end portions of the cover window 10 may have different radius of curvature. According to an embodiment, the two opposite end portions of the cover window 10 may have a same radius of curvature. According to an alternative embodiment, the entire cover window 10 may be curved. In such an embodiment, the cover window 10 may have a single radius of curvature. According to another alternative embodiment, the cover window 10 may have a plurality of radius of curvature. For convenience of description, an embodiment where the cover window 10 includes the two opposite curved end portions having different radius of curvature from each other and the flat center portion will hereinafter be described in detail.

After being molded, the cover window 10 as described above may include a flat first cover window (not shown), a second cover window (not shown) extending from the first cover window, and a second cover window (not shown) extending from the first cover window. In such an embodiment, after the cover window 10 is molded, the second cover window and the third cover window may correspond to curved portions of the cover window 10, where radius of curvature of the second cover window and the third cover window may be different from each other. In one embodiment, for example, the radius of curvature of the third cover window may be greater than the radius of curvature of the second cover window.

The groove 411 of the first mold 410 may correspond to a surface of the cover window 10, e.g., a surface of the first cover window, a surface of the second cover window and a surface of the third cover window. In an embodiment, the groove 411 may have a shape identical to the shape of the surface of the cover window 10, e.g., the combined shape of the first cover window, the second cover window and the third cover window.

The sleeve 420 may be disposed on the first cover window. In an embodiment, the sleeve 420 may hold or support the first cover window together with the first mold 410. In such an embodiment, the sleeve 420 may press the first cover window.

Insertion holes 421 and 422, to which the second molds 430 are inserted, may be defined in the sleeve 420. In an embodiment, the insertion holes 421 and 422 may guide the second molds 430, such that the second molds 430 may move linearly. In an embodiment, as shown in FIG. 2, the insertion holes 421 and 422 may limit movements of the second molds 430 by preventing the second molds 430 from moving in a horizontal direction and allowing the second molds 430 to move only in a vertical direction.

The second molds 430 may mold the cover window 10 to be partially curved. In an embodiment, the second molds 430 may be arranged in a position corresponding to curved portions of the cover window 10 to be molded, where the number of the second molds 430 may correspond to the number of curved portions of the molded cover window 10. In one embodiment, for example, where the molded cover window 10 includes two curved portions, the deforming unit 400 may include two second molds 430. In an alternative embodiment, where the molded cover window 10 includes three curved portions, the deforming unit 400 may include three second molds 430. In such an embodiment, the molded cover window 10 may include a plurality of curved portions, and the deforming unit 400 may include the plurality of second molds 430. Hereinafter, for convenience of description, an embodiment where the molded cover window 10 includes two curved portions and the deforming unit 400 may include two second molds 430, as shown in FIG. 2, will be described in detail.

In an embodiment, the second mold 430 may include a first sub-mold 431 at a location corresponding to that of the second cover window that is one curved portion of the cover window 10 after being molded. In such an embodiment, the second mold 430 may include a second sub-mold 432 arranged at a location corresponding to that of the third cover window that is the other curved portion of the cover window 10 after being molded.

In an embodiment, as described above, the first sub-mold 431 and the second sub-mold 432 may be inserted into the sleeve 420 and move linearly. In such an embodiment, the insertion holes 421 and 422 of the sleeve 420 may include a first insertion hole 421 arranged at a location corresponding to that of the first sub-mold 431 and a second insertion hole 422 arranged at a location corresponding to that of the second sub-mold 432. The first insertion hole 421 and the second insertion hole 422 may be arranged in correspondence to portions of the first sub-mold 431 and the second sub-mold 432, respectively. In an embodiment, the first insertion hole 421 and the second insertion hole 422 may have substantially 'T'-like shapes.

In an embodiment, as shown in FIG. 2, the first sub-mold 431 may include a first contacting unit 431a and a first presser 431b. In such an embodiment, the width of the first contacting unit 431a and the width of the first presser 431b that are measured in the lengthwise direction (e.g., the x-axis direction) of the sleeve 420 may be different from each other. In such an embodiment, the width of the first contacting unit 431a may be greater than that of the first presser 431b. In such an embodiment, the first contacting unit 431a and the first presser 431b may be connected to each other and constitute a 'T'-like structure.

In an alternative embodiment, the first contacting unit 431a and the first presser 431b may be modified to have various shapes. In one embodiment, for example, the first contacting unit 431a and the first presser 431b may have hexahedral shapes.

In an embodiment, the second sub-mold 432 may include a second contacting unit 432a, a second presser 432b, and a second protrusion 432c. In such an embodiment, the second contacting unit 432a and the second presser 432b are identical or similar to the first contacting unit 431a and the first presser 431b, and any repetitive detailed descriptions thereof will be omitted.

In an embodiment, the second protrusion 432c may have a curved surface. In such an embodiment, the curved surface of the second protrusion 432c may be moved to contact the third cover window and curve the third cover window. In such an embodiment, a portion of the second protrusion 432c may protrude toward the groove 411 of the first mold 410, and thus the portion of the second protrusion 432c may be inserted to the groove 411.

The first sub-mold 431 and the second sub-mold 432 as described above may protrude from the sleeve 420 to different heights. In such an embodiment, the heights of the portions of the first sub-mold 431 and the second sub-mold 432 protruding from the sleeve 420 may vary according to radius of curvature of curved portions of the cover window 10. In one embodiment, for example, the heights of the portions of the first sub-mold 431 and the second sub-mold 432 protruding from the sleeve 420 may be proportional to radius of curvature of curved portions of the cover window 10. In an embodiment, where the radius of curvature of the molded second cover window is smaller than that of the molded third cover window as shown in FIG. 2, the height of the portion of the first sub-mold 431 protruding from the sleeve 420 may be smaller than the height of the portion of the second sub-mold 432 protruding from the sleeve 420.

In an embodiment, the pressing plate 440 may include a first pressing plate 441 and a second pressing plate 442. In such an embodiment, the first pressing plate 441 may move linearly and may contact and press the sleeve 420 and the second mold 430 to the first mold 410. A surface of the first pressing plate 441 contacting the sleeve 420 and the second mold 430 may be flat. In an embodiment, the second pressing plate 442 may be arranged to face a surface of the first mold 410.

According to an embodiment, the first pressing plate 441 may include a first pressing plate body 441a that contacts the sleeve 420 and the second mold 430, and a first heater 441b disposed or installed in the first pressing plate body 441a. In such an embodiment, the first heater 441b may have a bar-like shape and inserted into the first pressing plate body 441a. According to an alternative embodiment, the first pressing plate 441 may include the first pressing plate body 441a in which the first heater 441b is not included. In such an embodiment, the first heater 441b may be separately installed outside the first pressing plate body 441a. However, for convenience of description, an embodiment, where the first pressing plate 441 includes the first pressing plate body 441a and the first heater 441b, will hereinafter described in detail.

In an embodiment, the first pressing plate 441 may sequentially move linearly and contact and press the second mold 430 and the sleeve 420. In such an embodiment, the first pressing plate 441 may sequentially contact and press the second sub-mold 432, the first sub-mold 431 and the sleeve 420 in predetermined order determined based on height thereof with reference to the first mold 410, e.g., in the order of the second sub-mold 432, the first sub-mold 431 and the sleeve 420.

According to an embodiment, the second pressing plate 442 may include a second pressing plate body 442a and a second heater 442b. In such an embodiment, the second pressing plate body 442a and the second heater 442b are arranged similar or identical to the first pressing plate body 441a and the first heater 441b, respectively. Therefore, detailed descriptions thereof will be omitted. According to an alternative embodiment, the second pressing plate 442 may include the second pressing plate body 442a in which the second heater 422b is not included. In such an embodiment, the second heater 442b may be separately installed outside the second pressing plate body 442a. However, for convenience of description, an embodiment where the second pressing plate 442 includes the second pressing plate body 442a and the second heater 442b will hereinafter be described in detail.

The driver 450 may be connected to at least one of the first pressing plate 441 and the second pressing plate 442 and linearly move the at least one of the first pressing plate 441 and the second pressing plate 442. However, for convenience of description, an embodiment where the driver 450 is connected to the first pressing plate 441 and linearly moves the first pressing plate 441, as shown in FIG. 2, will be described in detail.

In an embodiment, the driver 450 may have one of various structures. In one embodiment, for example, the driver 450 may include a cylinder connected to the first pressing plate 441. According to an alternative embodiment, the driver 450 may include a rack gear connected to the first pressing plate 441, a pinion gear connected to the rack gear, and a motor connected to the pinion gear. According to another alternative embodiment, the driver 450 may include a linear motor connected to the first pressing plate 441. In another alternative embodiment, the driver 450 may include a ball screw connected to the first pressing plate 441 and a motor connected to the ball screw. However, structures of the driver 450 are not limited thereto, and the driver 450 may include any device or structure for linearly moving the first pressing plate 441. However, for convenience of description, an embodiment where the driver 450 includes a cylinder will hereinafter be described in detail.

In an embodiment, as shown in FIG. 3, the cooling unit 500 may include a first cooling plate 510, a second cooling plate 520 and a cooling plate driver 530. The first cooling plate 510 may include a first cooling plate body 511 contacting the sleeve 420 and the second mold 430 and a first cooler 512 installed in the first cooling plate body 511. In such an embodiment, the first cooler 512 may be arranged to have one of various structures. In one embodiment, for example, the first cooler 512 may include a thermoelectric device. According to an alternative embodiment, the first cooler 512 may include a pipe in which a coolant, such as a cooling water, flows. However, for convenience of description, an embodiment where the first cooler 512 includes a pipe in which a coolant, such as a cooling water, flows, will hereinafter be described in detail.

In an embodiment, the second cooling plate 520 may include a second cooling plate body 521 arranged to face the first mold 410 and a second cooler 522 installed in the second cooling plate body 521. In such an embodiment, the second cooling plate body 521 and the second cooler 522 are identical or similar to the first cooling plate body 511 and the first cooler 512, and any repetitive detailed descriptions thereof will be omitted.

The cooling plate driver 530 may be connected to at least one of the first cooling plate 510 and the second cooling plate 520 and linearly move the at least one of the first cooling plate 510 and the second cooling plate 520. In such an embodiment, the cooling plate driver 530 is identical or similar to the driver 450, and any repetitive detailed descriptions thereof will be omitted. Hereinafter, for convenience of description, an embodiment where the cooling plate driver 530 linearly moves only the first cooling plate 510 will be described in detail.

The unloading unit 600 may take out the cover window 10, which is transferred by the transferring unit 200 and is on the first mold 410. IN an embodiment, a robot arm or the like may be installed at the unloading unit 600.

The display apparatus manufacturing apparatus 1 as described above may include configurations other than the above-stated configuration. In one embodiment, for example, the display apparatus manufacturing apparatus 1 may further include a plurality of pre-heating units 300. In such an embodiment, the display apparatus manufacturing apparatus 1 may further include a washing unit (not shown) for washing a surface of the fabricated cover window 10. The display apparatus manufacturing apparatus 1 may further include a drying unit (not shown) for drying a washing liquid sprayed by the washing unit by blowing the hot wind thereto. In an embodiment, the display apparatus manufacturing apparatus 1 may further include various devices for fabricating the display apparatus manufacturing apparatus 1 other than the above-stated components.

Hereinafter, an embodiment of a method of fabricating the cover window 10 by using the display apparatus manufacturing apparatus 1 will be described in detail. In an embodiment of a method of fabricating the cover window 10 by using the display apparatus manufacturing apparatus 1, as shown in FIG. 1, a glass-based mother material M may be supplied from outside by the loading unit 100. In such an embodiment, the mother material M may have a flat plate-like shape.

The loading unit 100 may accommodate or dispose the mother material M on the first mold 410. In an embodiment, the first mold 410 may be installed on the transferring unit 200, such that the first mold 410 may linearly move. In one embodiment, for example, the first mold 410 may be installed on the conveyer belt 210. According to an alternative embodiment, the first mold 410 may be installed by being accommodated on a separate shuttle (not shown) installed on the conveyer belt 210. In such an embodiment, the conveyer belt 210 and the shuttle may have open center portions. For convenience of description, an embodiment where the first mold 410 is directly accommodated on the conveyer belt 210 and moved will hereinafter be described in detail.

In an embodiment, the sleeve 420 and the second mold 430 may be provided or installed on the first mold 410 after the mother material M is accommodated on the first mold 410, e.g., when the first mold 410 including the mother material M thereon is moved to position therebelow. According to an alternative embodiment, the sleeve 420 and the second mold 430 may be installed on the first mold 410, and then the mother material M may be provided between the sleeve 420 and the second mold 430. However, for convenience of description, an embodiment, where the sleeve 420 and the second mold 430 are installed on the first mold 410 after the mother material M is accommodated on the first mold 410 will hereinafter be described in detail.

In an embodiment, the sleeve 420 and the second mold 430 may be installed on the first mold 410 by an outside robot arm or the like. According to an alternative embodiment, the sleeve 420 and the second mold 430 may be installed on the first mold 410 by an operator. For convenience of description, an embodiment where the sleeve 420 and the second mold 430 are installed on the first mold 410 by a robot arm or the like will hereinafter be described in detail.

When the first mold 410 moves as the conveyer belt 210 moves, the pre-heater 310 may be operated and heat the mother material M. In an embodiment, the roller driver 230 may repeatedly be operated for a predetermined time period and then stop for a predetermined time period.

After being pre-heated, the mother material M may move to the pressing plate 440 and the driver 450 of the deforming unit 400 together with the first mold 410. In an embodiment, when the first mold 410 is arranged below the sleeve 420 and the second mold 430, an operation of the roller driver 230 may be stopped.

A location of the first mold 410 may be adjusted in correspondence to those of the sleeve 420 and the second mold 430. In an embodiment, the deforming unit 400 may further include a vision unit 700 for determining locations of the first mold 410, the sleeve 420 and the second mold 430. The vision unit 700 may captures images the first mold 410, the sleeve 420 and the second mold 430 to obtain location information thereof. In such an embodiment, the location of the first mold 410 may be adjusted based on the location information of the first mold 410, the sleeve 420 and the second mold 430.

In such an embodiment, when it is determined that the locations of the first mold 410, the sleeve 420 and the second mold 430 correspond to one another, the driver 450 may be operated and linearly move the first pressing plate 441. In such an embodiment, the driver 450 may be operated and linearly move the first pressing plate 441 when the second pressing plate 442 is arranged above the first mold 410.

In such an embodiment, when the first pressing plate 441 is linearly moved to the second pressing plate 442 as described above, the first heater 441b and the second heater 442b may be operated and heat the mother material M.

The first pressing plate 441 may sequentially contact the second sub-mold 432, the first sub-mold 431 and the sleeve 420 in a predetermined order, e.g., the order of the second sub-mold 432, the first sub-mold 431 and the sleeve 420. In an embodiment, the sleeve 420 may contact the mother material M and press the mother material M by using the weight of the sleeve 420. In such an embodiment, the first sub-mold 431 may contact the first pressing plate 441 and start pressing a portion of the mother material M. In such an embodiment, the first sub-mold 431 may deform, e.g., bend, a portion of the mother material M. Next, when the first pressing plate 441 contacts the second sub-mold 432, the second sub-mold 432 may contact a portion of the mother material M and press the mother material M.

When the first pressing plate 441 continues moving toward the sleeve 420 as described above, the first pressing plate 441 may contact all of the first sub-mold 431, the second sub-mold 432 and the sleeve 420 after a certain time is elapsed. In an embodiment, the first pressing plate 441 may press all of the first sub-mold 431, the second sub-mold 432 and the sleeve 420, such that the first sub-mold 431, the second sub-mold 432 and the sleeve 420 may press the mother material M.

When the first sub-mold 431, the second sub-mold 432 and the sleeve 420 press the mother material M as described above, the first sub-mold 431, the second sub-mold 432, and the sleeve 420 may press the mother material M with a uniform pressure throughout the mother material M. In such an embodiment, the first sub-mold 431 and the second sub-mold 432 for bending the mother material M may be prevented from applying excessive pressures.

If the first sub-mold 431, the second sub-mold 432 and the sleeve 420 are integrally formed as a single unitary and indivisible component or the first sub-mold 431 and the second sub-mold 432 are integrally formed as a single unitary and indivisible component and the integrated component is inserted to the sleeve 420, when the first sub-mold 431, the second sub-mold 432 and the sleeve 420 are pressed by using the first pressing plate 441, a pressure applied to the sleeve 420, a pressure applied to the first sub-mold 431 and a pressure applied to the second sub-mold 432 may be different from one another. In particular, such differences between pressures may be increased in case where a portion of the mother material M is bent to have large radius of curvature. In this case, pressure differences may occur based on radius of curvature in the case of bending the mother material M, and thus the mother material M may be bent differently from an intended design. In particular, if the first sub-mold 431 and the second sub-mold 432 are integrally formed as a single unitary and indivisible component and the sleeve 420 is arranged separately, pressures may differ based on a planarity between respective connected portions at which the sleeve 420 is connected to the first sub-mold 431 and the second sub-mold 432. However, in an embodiment of the display apparatus manufacturing apparatus 1, the first sub-mold 431, the second sub-mold 432 and the sleeve 420 may be independently arranged to allow some margins, and thus the first sub-mold 431, the second sub-mold 432 and the sleeve 420 may be uniformly pressed by using the first pressing plate 441.

In such an embodiment, when the locations of the first pressing plate 441 and the second pressing plate 442 are fixed after the cover window 10 is formed by pressing the mother material M, temperatures of the first heater 441b and the second heater 442b may be gradually lowered.

Next, the first mold 410, the second mold 430 and the sleeve 420 may be transferred to the cooling unit 500 via the conveyer belt 210. At the cooling unit 500, the first cooling plate 510 and the second cooling plate 520 may be brought into contact with the second mold 430, the sleeve 420 and the first mold 410, thereby cooling the cover window 10. In such an embodiment, the cover window 10 may maintain the molded shape by being rapidly cooled.

After the above-stated operations are completed, the cover window 10 may be supplied to the unloading unit 600 while being accommodated on the first mold 410. In an embodiment, the second mold 430 and the sleeve 420 may be removed from the cover window 10.

In an embodiment, as described above, the display apparatus manufacturing apparatus 1 may substantially reduce defects of the cover window 10 as much as possible by providing an uniform pressure during fabrication of the cover window 10. In such an embodiment, the display apparatus manufacturing apparatus 1 may effectively prevent formation of possible wave patterns at bent portions of the cover window 10 by providing a uniform pressure to the cover window 10.

Figure 4:
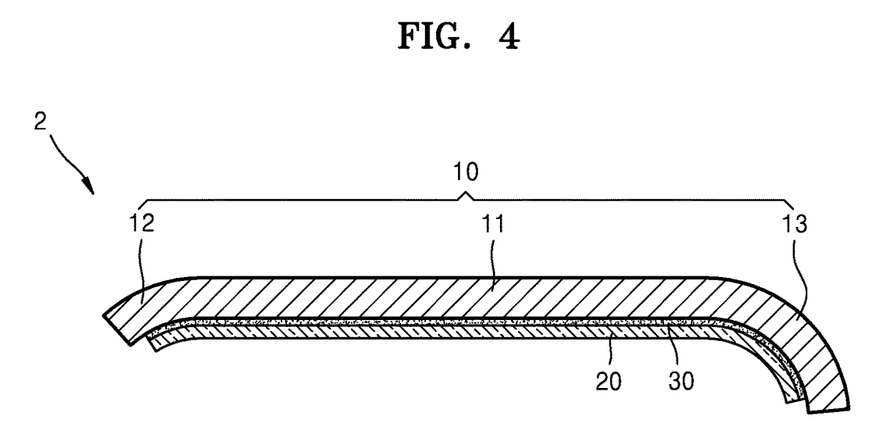
FIG. 4 is a cross-sectional diagram showing a display apparatus manufactured by the apparatus for manufacturing a display apparatus shown in FIG. 1.
Figure 5:
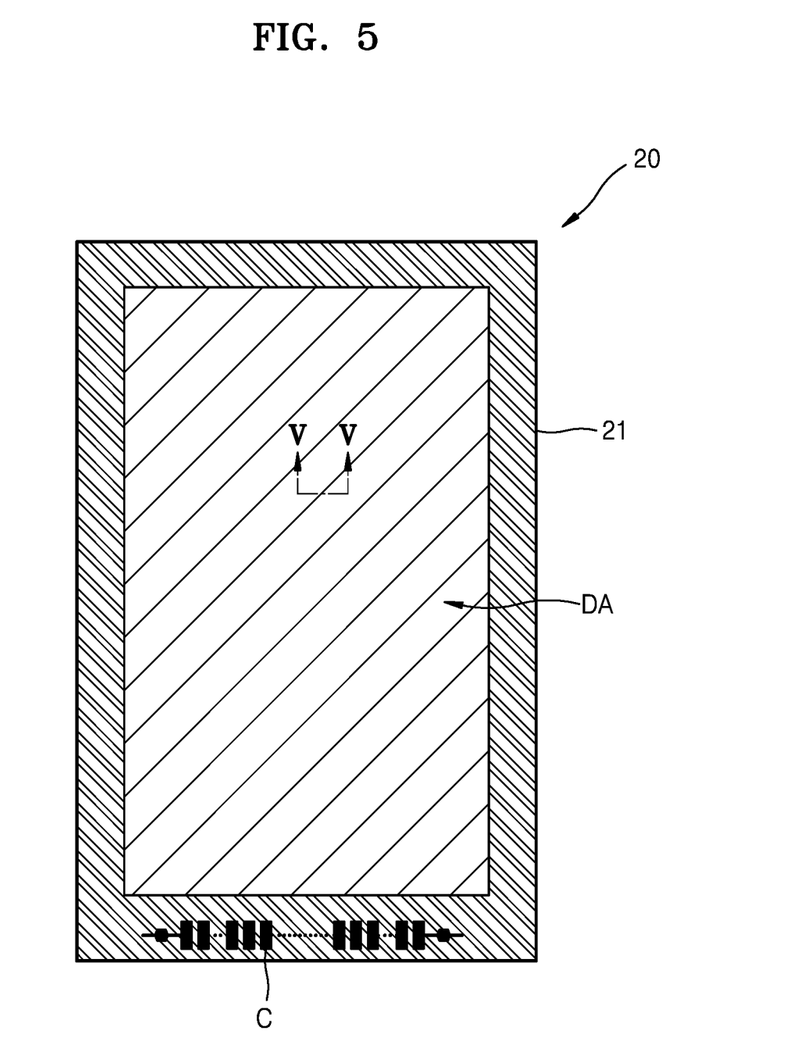
FIG. 5 is a plan view of a portion of the display apparatus shown in FIG. 4.
Figure 6:
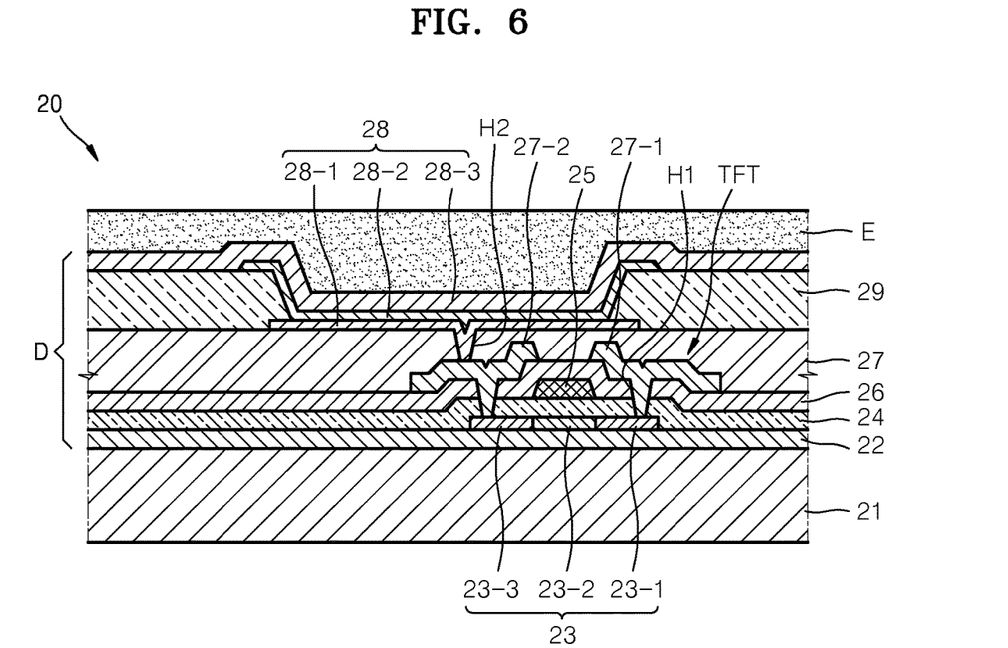
FIG. 6 is a cross-sectional diagram taken along line V-V of FIG. 5.

FIG. 4 is a sectional diagram showing a display apparatus manufactured by the display apparatus manufacturing apparatus shown in FIG. 1. FIG. 5 is a plan view of a portion of the display panel shown in FIG. 4. FIG. 6 is a sectional diagram taken along line V-V of FIG. 5.

Referring to FIGS. 4 and 5, an embodiment of a display apparatus 2 may include a cover window 10, an adhesive element 30 and a panel element 20.

The cover window 10 may be at least partially curved. In an embodiment, the cover window 10 may include or be formed of a transparent material, e.g., one of various photo-transmissive materials. In one embodiment, for example, the cover window 10 may include or be formed of an acrylic material or a plastic material. According to an alternative embodiment, the cover window 10 may include or be formed of a glass-based material. The cover window 10 may have a multi-layer structure including a plurality of layers formed of a transparent material. For convenience of description, an embodiment where the cover window 10 is formed of a glass-based material will hereinafter be described in detail.

The cover window 10 may include a flat first cover window 11, a second cover window 12 extending from the first cover window 11 and a second cover window 13 extending from the first cover window 11. In an embodiment, the second cover window 12 and the third cover window 13 may be curved portion of the cover window 10 having predetermined radius of curvature. The radius of curvature of the second cover window 12 and the radius of curvature of the third cover window 13 may be different from each other. In an embodiment, the radius of curvature of the third cover window 13 may be greater than the radius of curvature of the second cover window 12.

The panel element 20 may include various devices. In one embodiment, for example, the panel element 20 may include a display panel (not shown). According to an embodiment, the panel element 20 may include a touch screen panel ("TSP"). According to another embodiment, the panel element 20 may include a protective film attached to the cover window 10. In an embodiment, the protective film may effectively prevent a surface of the cover window 10 from damages, e.g., due to scratches or foreign substances. However, the panel element 20 is not limited to those described above, and the cover window 10 may include any flexible-type device that may be attached to the cover window 10. However, for convenience of description, an embodiment where the panel element 20 includes the display panel will hereinafter be described in detail.

In an embodiment, the adhesive element 30 may be provided or installed on at least one of the panel element 20 and the cover window 10. In such an embodiment, the adhesive element 30 may be provided or installed on a surface of the panel element 20 facing the cover window 10 or a surface of the cover window 10 facing the panel element 20.

The adhesive element 30 may include an optical adhesive. In an embodiment, the adhesive element 30 may include an optical clearance adhesive ("OCA").

The panel element 20 (the display panel) may define a display area DA and a non-display area outside the display area on a substrate 21. A light-emitter D may be disposed at the display area DA, and a power wire (not shown) may be disposed at the non-display area, for example. In such an embodiment, a pad C may be disposed at the non-display area.

The panel element 20 may include the substrate 21 and the light-emitter D. In an embodiment, an organic light-emitting display panel 20 may include a thin-film encapsulation layer disposed above the light-emitter D. In an embodiment, the substrate 21 may include or be formed of a plastic material or a metal, such as a stainless steel ("SUS") or Ti. In an embodiment, the substrate 21 may include be formed of polyimide ("PI"). For convenience of description, an embodiment where the substrate 21 is formed of PI will hereinafter be described in detail.

The light-emitter D may be disposed on the substrate 21. In an embodiment, in the light-emitter D, a thin-film transistor ("TFT") may be disposed, a passivation film 27 may be disposed to cover the TFT, and an organic light-emitting device ("OLED") 28 may be disposed on the passivation film 27.

A buffer layer 22 including an organic compound and/or an inorganic compound is further disposed on the top surface of the substrate 21, where the buffer layer 22 may include or be formed of $SiO_x(x\geq1)$ and/or $SiN_x$ ($x\geq1$).

After an active layer 23 is disposed on the buffer layer 22 in a certain pattern, the active layer 23 is covered by a gate insulation layer 24. The active layer 23 includes a source region 23-1 and a drain region 23-3 and further includes a channel region 23-2 therebetween.

The active layer 23 may be disposed to contain various materials. In one embodiment, for example, the active layer 23 may include an inorganic semiconductor material, such as amorphous silicon or crystalline silicon. In another example, the active layer 23 may contain an oxide semiconductor. In another example, the active layer 23 may contain an organic semiconductor material. However, for convenience of description, descriptions below will be given in relation to a case where the active layer 23 is formed of amorphous silicon.

The active layer 23 may be provided by forming an amorphous silicon layer on the buffer layer 22, forming a polycrystalline silicon layer by crystallizing the amorphous silicon layer, and patterning the polycrystalline silicon layer. The source region 23-1 and the drain region 23-3 of the active layer 23 are doped with impurities according to types of TFT, such as a driving TFT (not shown) and a switching TFT (not shown).

A gate electrode 25 corresponding to the active layer 23 and an interlayer insulation layer 26 covering the gate electrode 25 are provided on the top surface of the gate insulation layer 24.

In such an embodiment, after a contact hole H1 is formed through the interlayer insulation layer 26 and the gate insulation layer 24, a source electrode 27-1 and a drain electrode 27-2 are provided on the interlayer insulation layer 26, such that the source electrode 27-1 and the drain electrode 27-2 contact the source region 23-1 and the drain region 23-3, respectively.

A passivation film 27 is provided on the TFT described above, and a pixel electrode 28-1 of the OLED 28 is disposed on the passivation film 27. The pixel electrode 28-1 contacts the drain electrode 27-2 of the TFT via a via hole H2 defined in the passivation film 27. The passivation film 27 may contain an inorganic material and/or an organic material and include a single layer or two or more layers, where the passivation film 27 may function as a planarizing layer to have the flat top surface regardless of indentations of a layer therebelow or may be indented correspondingly to the indentations of the layer therebelow. In such an embodiment, the passivation film 27 may include or be formed of a transparent insulator for resonance effect.

After the pixel electrode 28-1 is provided on the passivation film 27, a pixel defining layer 29 including or formed of an organic material and/or an inorganic material is provided to cover the pixel electrode 28-1 and the passivation film 27, where the pixel defining layer 29 is partially removed to expose the pixel electrode 28-1.

In such an embodiment, an intermediate layer 28-2 and a counter electrode 28-3 are provided at least on the pixel electrode 28-1.

The pixel electrode 28-1 functions as an anode, and the counter electrode 28-3 functions as a cathode, but not being limited thereto. Alternatively, the pixel electrode 28-1 may function as a cathode and the counter electrode 28-3 may function as an anode.

The pixel electrode 28-1 and the counter electrode 28-3 are insulated from each other by the intermediate layer 28-2, where voltages having different polarities are applied to the intermediate layer 28-2 for light emission of an organic emission layer.

The intermediate layer 28-2 may include an organic emission layer. According to an embodiment, the intermediate layer 28-2 may include an organic emission layer and may further include at least one of a hole injection layer ("HIL"), a hole transport layer ("HTL"), an electron transport layer ("ETL"), and an electron injection layer ("EIL"). However, the embodiment is not limited thereto, and the intermediate layer 28-2 may include an organic emission layer and may further include various other function layers (not shown).

In an embodiment, a single unit pixel includes a plurality of sub-pixels, where the plurality of sub-pixels may emit light of various colors. In one embodiment, for example, the plurality of sub-pixels may include sub-pixels (not shown) for emitting red light, green light, and blue light or sub-pixels (not shown) for emitting red light, green light, blue light, and white light.

In an embodiment, the thin-film encapsulation layer E as described above may include a plurality of inorganic layers or a combination of an inorganic layer and an organic layer.

The organic layer of the thin-film encapsulation layer E may include or be formed of a polymer and may have a single layer structure or a multilayer structure. In an embodiment, the organic layer of the thin-film encapsulation layer E may include or be formed of any one of polyethylene terephthalate, polyimide, polycarbonate, epoxy, polyethylene, and polyacrylate. In one embodiment, for example, the organic layer may include be formed of polyacrylate. In one embodiment, for example, the organic layer may include a polymerized monomer composition including a deacrylate-based monomer and a triacrylate-based monomer. In such an embodiment, the monomer composition may further include a photoinitiator known in the art, such as TPO, but the inventive concept is not limited thereto.

The inorganic layer of the thin-film encapsulation layer E may have a single layer structure or a multilayer structure, including a metal oxide or a metal nitride. In an embodiment, the inorganic layer may include at least one selected from $SiN_x$, $Al_2O_3$, $SiO_2$, and $TiO_2$.

The topmost layer of the thin-film encapsulation layer E exposed to outside may be an inorganic layer for preventing moisture permeation to an OLED.

In an embodiment, the thin-film encapsulation layer E may have a sandwich structure including two inorganic layers and an organic layer interposed therebetween. In an alternative embodiment, the thin-film encapsulation layer E may have a sandwich structure including two organic layers and an inorganic layer interposed therebetween. In another alternative embodiment, the thin-film encapsulation layer E may have a sandwich structure including two inorganic layers and an organic layer interposed therebetween and a sandwiched structure including two organic layers and an inorganic layer interposed therebetween.

In an embodiment, the thin-film encapsulation layer E may include a first inorganic layer, a first organic layer and a second inorganic layer, which are sequentially disposed one on another from the top surface of the OLED.

In an alternative embodiment, the thin-film encapsulation layer E may include a first inorganic layer, a first organic layer, a second inorganic layer, a second organic layer and a third inorganic layer, which are sequentially disposed one on another from the top surface of the OLED.

In another alternative embodiment, the thin-film encapsulation layer E may include a first inorganic layer, a first organic layer, a second inorganic layer, the second inorganic layer, a third inorganic layer, a third organic layer and a fourth inorganic layer, which are sequentially disposed one on another from the top surface of the OLED.

In an embodiment, a halogenated metal layer containing LiF may be further provided between the OLED and the first inorganic layer. The halogenated metal layer may effectively prevent the OLED from being damaged while the first inorganic layer is provided via sputtering.

The first organic layer may have a smaller area than the second inorganic layer, and the second organic layer may have a smaller area than the third inorganic layer, when viewed from a top plan view in a thickness direction of the display apparatus.

In an embodiment, the cover window 10 is precisely fabricated, such that the display apparatus 2 may display an image with improved quality, e.g., a clear image.

Figure 7:
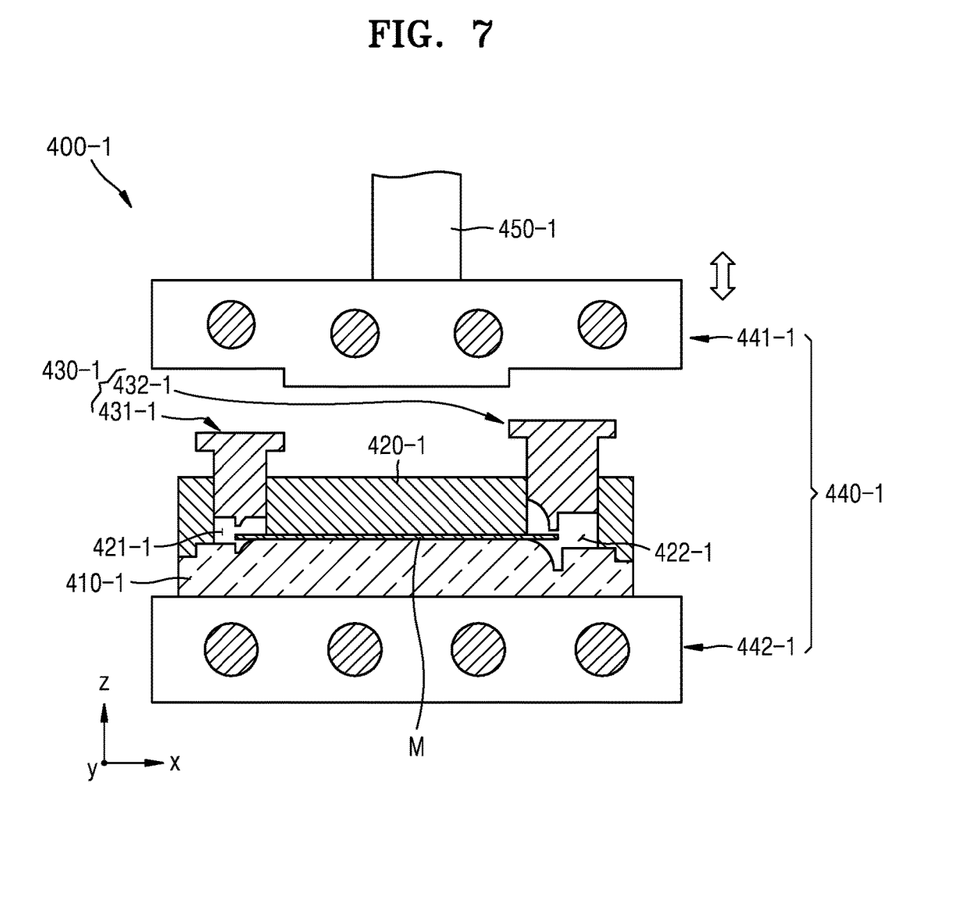
FIG. 7 is a cross-sectional diagram showing an alternative embodiment of the deforming unit of the apparatus for manufacturing a display apparatus shown in FIG. 1.
Figure 8:
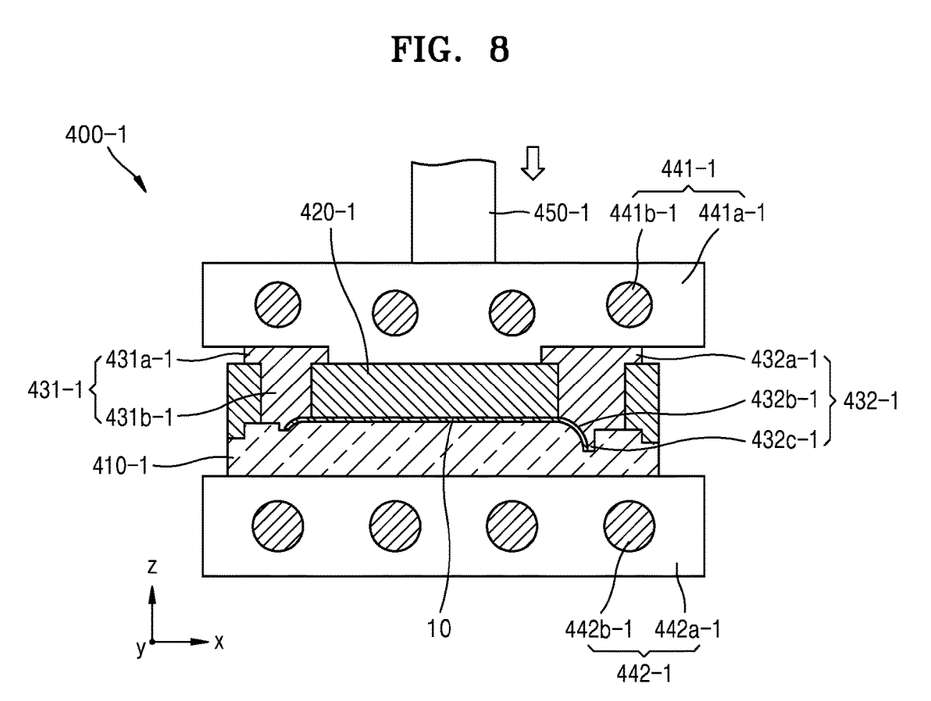
FIG. 8 is a cross-sectional diagram showing an operation state of the deforming unit shown in FIG. 7.

FIG. 7 is a sectional diagram showing an alternative embodiment of the deforming unit of the display apparatus manufacturing apparatus shown in FIG. 1. FIG. 8 is a sectional diagram showing operation state of the deforming unit shown in FIG. 7.

Referring to FIGS. 7 and 8, an embodiment of a display apparatus manufacturing apparatus (not shown) may be substantially to the same as the embodiments of the display apparatus manufacturing apparatus described above except for the deforming unit 400-1, and any repetitive detailed description thereof will hereinafter be omitted or simplified.

In an alternative embodiment, as shown in FIGS. 7 and 8, the deforming unit 400-1 may include a first mold 410-1, a sleeve 420-1, a second mold 430-1, a pressing plate 440-1 and a driver 450-1. In such an embodiment, the first mold 410-1 and the sleeve 420-1 are substantially to the same as those described above, and any repetitive detailed description thereof will be omitted.

In such an embodiment, the second mold 430-1 may be inserted into the sleeve 420-1. In such an embodiment, an insertion hole (not shown) may be defined in the sleeve 420-1 to insert the second mold 430-1 thereto.

The second mold 430-1 may include a first sub-mold 431-1 and a second sub-mold 432-1 that are spaced apart from each other and inserted to the sleeve 420-1. In such an embodiment, the first sub-mold 431-1 may include a first contacting unit 431a-1 and a first presser 431b-1. In such an embodiment, the second sub-mold 432-1 may include a second contacting unit 432a-1, a second presser 432b-1 and a second protrusion 432c-1. In such an embodiment, the first sub-mold 431-1 and the second sub-mold 432-1 are substantially the same as those described above, and any repetitive detailed description thereof will be omitted.

The pressing plate 440-1 may include a first pressing plate 441-1 and a second pressing plate 442-1. In such an embodiment, the first pressing plate 441-1 may include a first pressing plate body 441a-1. In an alternative embodiment, a first heater 441b-1 may be provided separately from the first pressing plate body 441a-1 and disposed an outside thereof. According to an embodiment, the first pressing plate 441-1 may include the first pressing plate body 441a-1 and the first heater 441b-1. In such an embodiment, the first heater 441b-1 may be disposed in or fixed to the first pressing plate body 441a-1 and may move together with the first pressing plate body 441a-1. For convenience of description, an embodiment where the first pressing plate 441-1 includes the first pressing plate body 441a-1 and the first heater 441b-1 will hereinafter be described in detail.

The first pressing plate body 441a-1 may be provided to have an indented surface. In one embodiment, for example, the thicknesses of recessed portions of the first pressing plate body 441a-1 corresponding to the first sub-mold 431-1 and the second sub-mold 432-1 may be smaller than the thickness of the remaining portion of the first pressing plate body 441a-1. In such an embodiment, positions of the recessed portions of the first pressing plate body 441a-1 may be determined based on locations of the first sub-mold 431-1 and the second sub-mold 432-1 and pressure to be applied to the first sub-mold 431-1 and the second sub-mold 432-1. The center portion of the first pressing plate body 441a-1 may protrude more than the remaining portion of the first pressing plate body 441a-1. In such an embodiment, the center portion of the first pressing plate body 441a-1 may contact the sleeve 420-1 and press the sleeve 420-1.

According to an embodiment, the second pressing plate 442-1 may include the second pressing plate body 442a-1. According to another embodiment, the second pressing plate 442-1 may include the second pressing plate body 442a-1 and a second heater 442b-1. In such an embodiment, the second pressing plate body 442a-1 and the second heater 442b-1 are substantially the same as the first pressing plate body 441a-1 and the first heater 441b-1, and any repetitive detailed description thereof will be omitted. For convenience of description, descriptions below will be given in relation to a case where the second pressing plate 442-1 includes the second pressing plate body 442a-1 and the second heater 442b-1.

In an embodiment, a method of manufacturing a display apparatus may substantially the same as the method described above with reference to FIGS. 1 through 3. For convenience of description, a method of fabricating the cover window 10 at the deforming unit 400-1 will be briefly described below.

When a mother material M is moved through a loading unit (not shown) and a heating unit (not shown) and is transferred to the deforming unit 400-1, the driver 450-1 may be operated and move the first pressing plate 441-1 toward the sleeve 420-1. In such an embodiment, the top end of the first sub-mold 431-1 and the top end of the second sub-mold 432-1 may have different heights from the sleeve 420-1. In such an embodiment, the top end of the second sub-mold 432-1 may be provided at a location higher than that of the top end of the first sub-mold 431-1.

The first pressing plate body 441a-1 may contact the second sub-mold 432-1 and press a portion of the mother material M. Here, the sleeve 420-1 may press the mother material M by using the weight of the sleeve 420-1.

In such an embodiment, after the first pressing plate body 441a-1 contacts the second sub-mold 432-1, the first pressing plate body 441a-1 approaches to the sleeve 420-1 due to the operation of the driver 450-1, the first pressing plate body 441a-1 may contact and press the first sub-mold 431-1 and the sleeve 420-1 sequentially in a predetermined order, e.g., in the order of the first sub-mold 431-1 and the sleeve 420-1. Therefore, the first pressing plate body 441a-1 may contact and press all of the first sub-mold 431-1, the second sub-mold 432-1, and the sleeve 420-1.

When the first pressing plate body 441a-1 presses as described above, the first pressing plate body 441a-1 may apply an uniform pressure to the first sub-mold 431-1, the second sub-mold 432-1 and the sleeve 420-1. In such an embodiment, the first heater 441b-1 and the second heater 442b-1 may be operated and heat the mother material M.

During the above-stated operations, the mother material M may be deformed to have the predetermined shape of the cover window 10. After the above-stated operations are completed, the cover window 10 may be cooled by gradually lowering temperatures of the first pressing plate body 441a-1 and the second heater 442b-1 of the deforming unit 400-1.

In such an embodiment, the cover window 10 may be moved to a cooler (not shown) together with the first mold 410-1, the second mold 430-1, and the sleeve 420-1 and may be rapidly cooled. In such an embodiment, after the cover window 10 is cooled, the cover window 10 may be moved to an unloading unit (not shown) and taken out.

Therefore, an embodiment of the display apparatus manufacturing apparatus may substantially reduce or minimize defects of the cover window 10 by providing a uniform pressure during fabrication of the cover window 10. In such an embodiment, the display apparatus manufacturing apparatus may effectively prevent formation of possible wave patterns at bent portions of the cover window 10 by providing a uniform pressure to the cover window 10.

According to embodiments of a display apparatus manufacturing apparatus and a method of manufacturing a display apparatus using the display apparatus manufacturing apparatus, a display apparatus with improved image quality, e.g., displaying a clear image, may be effectively manufactured.

According to embodiments of a display apparatus manufacturing apparatus and a method of manufacturing a display apparatus, fabrication defects of a cover window may be substantially reduced or minimized and a precise cover window may be fabricated.

According to embodiments of a display apparatus manufacturing apparatus and a method of manufacturing a display apparatus, a cover window may be efficiently or quickly fabricated in-line.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of manufacturing a display apparatus, the method comprising:
   accommodating a cover window on a first mold;
   pre-heating the cover window;
   arranging a sleeve and a second mold on the cover window on the first mold, wherein the second mold comprises a first sub-mold and a second sub-mold; and
   molding the cover window by pressing the first sub-mold, the second sub-mold and the sleeve to the first mold,
   wherein the molding the cover window by pressing the first sub-mold, the second sub-mold and the sleeve comprises moving a single pressing plate to contact the first sub-mold, the second sub-mold and the sleeve, and
   wherein the first sub-mold, the second sub-mold and the sleeve are disposed in a way such that the single pressing plate contacts the first sub-mold, the second sub-mold and the sleeve sequentially in the order of the second sub-mold, the first sub-mold and the sleeve when the single pressing plate moves to the first sub-mold, the second sub-mold and the sleeve.

2. The method of claim 1, further comprising:
   transferring the first mold on which the cover window is accommodated.

3. The method of claim 1, wherein the molding the cover window by pressing the sleeve and the second mold comprises heating the cover window.

4. The method of claim 1, further comprising:
   cooling the cover window.

5. The method of claim 4, wherein the cooling the cover window comprises arranging a pressing plate comprising a cooler on the sleeve and the second mold.

6. The method of claim 1, wherein the second mold is inserted into the sleeve and moves linearly.

7. The method of claim 1, wherein
   the sleeve contacts a flat portion of the cover window and supports the cover window, and
   the second mold contacts a portion of the cover window to be deformed.

8. The method of claim 7, wherein
   the first sub-mold and the second sub-mold are disposed to move linearly to the portion of the cover window to be deformed.

9. The method of claim 1, wherein a width of the second mold in a lengthwise direction of the sleeve is inconstant.

* * * * *